United States Patent
Yang (10) Patent No.: US 11,698,739 B2
(45) Date of Patent: Jul. 11, 2023

(54) MEMORY SYSTEM AND OPERATING METHOD THEREOF

(71) Applicant: SK hynix Inc., Gyeonggi-do (KR)

(72) Inventor: Soon Yeal Yang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 73 days.

(21) Appl. No.: 17/506,281

(22) Filed: Oct. 20, 2021

(65) Prior Publication Data

US 2022/0391092 A1 Dec. 8, 2022

(30) Foreign Application Priority Data

Jun. 7, 2021 (KR) .......................... 10-2021-0073582

(51) Int. Cl.
  *G06F 3/06* (2006.01)
(52) U.S. Cl.
  CPC ............ *G06F 3/064* (2013.01); *G06F 3/0604* (2013.01); *G06F 3/0652* (2013.01); *G06F 3/0659* (2013.01); *G06F 3/0683* (2013.01)
(58) Field of Classification Search
  CPC ...... G06F 3/064; G06F 3/0604; G06F 3/0652; G06F 3/0659; G06F 3/0683
  See application file for complete search history.

(56) References Cited

U.S. PATENT DOCUMENTS

| | | | |
|---|---|---|---|
| 8,117,381 B2* | 2/2012 | Gonzalez | G11C 29/76 365/185.11 |
| 11,042,432 B1* | 6/2021 | Rao | G06F 11/3037 |
| 2017/0315728 A1* | 11/2017 | Zheng | G06F 3/0604 |
| 2018/0373438 A1* | 12/2018 | Bennett | G06F 3/0652 |
| 2020/0247616 A1* | 8/2020 | Nitzberg | B65G 47/261 |
| 2021/0365200 A1* | 11/2021 | Alwala | G06F 3/0652 |
| 2023/0031745 A1* | 2/2023 | Noh | G06F 3/0659 |

FOREIGN PATENT DOCUMENTS

KR 1020190106008 A 9/2019
KR 1020200123683 A 10/2020

* cited by examiner

*Primary Examiner* — Francisco A Grullon
(74) *Attorney, Agent, or Firm* — IP & T Group LLP (57) ABSTRACT

A memory system includes a plurality of memory devices and a controller, wherein each of the plurality of memory devices includes zone blocks. The controller is configured to evenly distribute open zone blocks within the memory devices by referring to an activated zone block count table and a full zone block count table. The activated zone block count table includes an activated zone block count of each of the memory devices, and the full zone block count table includes a full zone block count of each of the memory devices.

20 Claims, 4 Drawing Sheets

MEMORY SYSTEM AND OPERATING METHOD THEREOF

CROSS-REFERENCES TO RELATED APPLICATION

The present application claims priority under 35 U.S.C. § 119(a) to Korean patent application number 10-2021-0073582, filed on Jun. 7, 2021, which is incorporated herein by reference in its entirety as set forth in full.

BACKGROUND

1. Technical Field

Various embodiments of the present disclosure are related to a memory system, and more particularly, to a memory system including a nonvolatile memory device.

2. Related Art

A memory system may be configured to store data provided from a host device in response to a write request from the host device. Furthermore, the memory system may be configured to provide stored data to the host device in response to a read request from the host device. The host device is an electronic device capable of processing data and may include a computer, a digital camera, a mobile phone and so forth. The memory system may be mounted in the host device or may be fabricated to be capable of being connected to and detached from the host device.

SUMMARY

In an embodiment of the present disclosure, a memory system may include a plurality of memory devices and a controller. Each of the plurality of memory devices may include zone blocks. The controller may be configured to evenly distribute open zone blocks within the memory devices by referring to an activated zone block count table and a full zone block count table. The activated zone block count table may include an activated zone block count of each of the memory devices, and the full zone block count table may include a full zone block count of each of the memory devices.

In an embodiment of the present disclosure, a memory system may include a plurality of memory devices and a controller. Each of the plurality of memory devices may include zone blocks. The controller may be configured to determine, based on an activated zone block count of a candidate memory device among the memory devices and differences of full zone block counts respectively corresponding to remaining memory devices among the memory devices, a candidate zone block included in the candidate memory device as a new open zone block. Each of the differences of the full zone block counts may be a difference between a full zone block count of the candidate memory device and the full zone block count of a corresponding memory device among the remaining memory devices.

In an embodiment of the present disclosure, an operating method of a memory system may include determining, as a candidate zone block, a free zone block having a least erase count among free zone blocks included in memory devices of a candidate memory device list; determining whether an activated zone block count of a candidate memory device, which has the candidate zone block, is greater than a first threshold; determining whether any of differences between a full zone block count of the candidate memory device and respective full zone block counts of remaining memory devices is greater than a second threshold; and determining the candidate zone block as a new open zone block according to results of the determining.

In an embodiment of the present disclosure, an operating method of a controller may include selecting, among a group of memory devices, a candidate memory device including a candidate free zone block of a least erase count among free zone blocks included in the group; mapping the candidate free zone block to an open zone for a host when a number of activated zone blocks included in the candidate memory device is less than a first threshold and when each of differences between a number of full zone blocks of the candidate memory device and respective numbers of full zone blocks of remaining memory devices other than the candidate memory device is less than a second threshold; and repeating the selecting and the mapping while evicting the candidate memory device from the group when the number of activated zone blocks is greater than the first threshold or when any of the differences is greater than the second threshold.

In an embodiment of the present disclosure, the operating method of a controller may further include mapping to the open zone, when all of the memory devices are evicted from the group due to the repeating, a free zone block of a least erase count among free zone blocks included in all of the memory devices.

DETAILED DESCRIPTION

Various embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The drawings are not necessarily to scale and, in some instances, proportions may have been exaggerated in order to clearly illustrate features of the embodiments. The terminology used herein is for the purpose of describing particular embodiments only and is not intended to be limiting of the disclosure.

As used herein, the term "and/or" includes at least one of the associated listed items. It will be understood that when an element is referred to as being "connected to", or "coupled to" another element, it may be directly on, connected to, or coupled to the other element, or one or more intervening elements may be present. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements.

Hereinafter, embodiments of the present disclosure will be described below with reference to the accompanying drawings.

According to an embodiment, provided may be a memory system capable of improving write and read performances thereof by evenly distributing open zone blocks within memory devices, and an operating method of the memory system.

Figure 1:
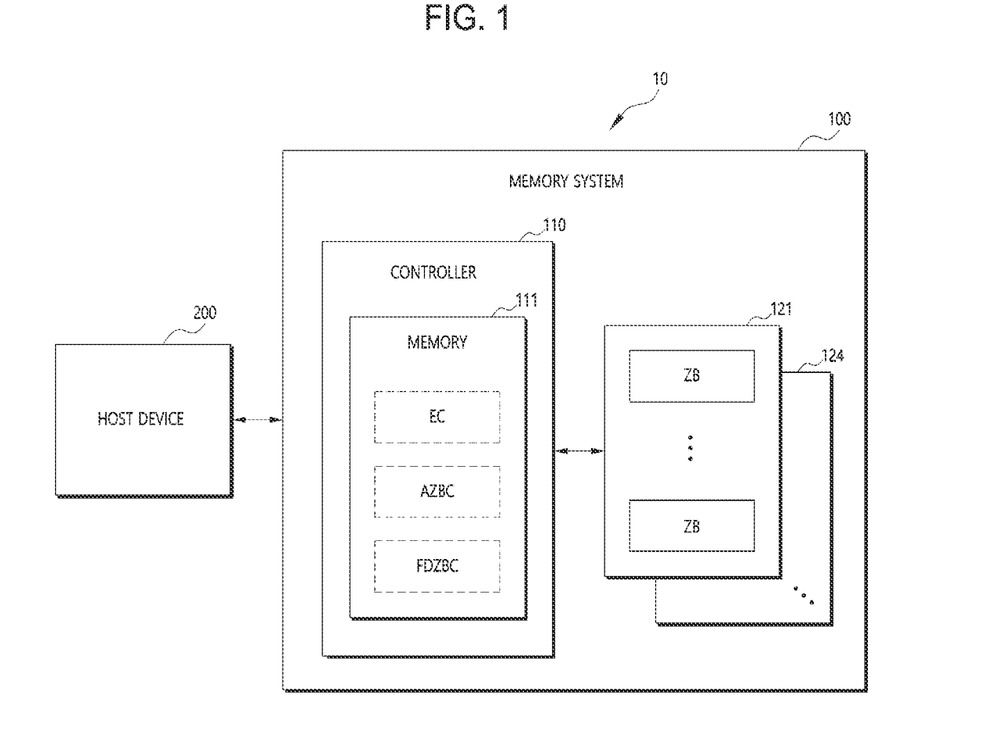
FIG. 1 is a block diagram illustrating a data processing system including a memory system according to an embodiment of the present disclosure.

FIG. 1 is a block diagram illustrating a data processing system 10 including a memory system 100 according to an embodiment of the present disclosure.

Referring to FIG. 1, the data processing system 10 may be an electronic system capable of processing data. The data processing system 10 may include a data center, an internet data center, a cloud data center, a personal computer, a laptop computer, a smartphone, a tablet computer, a digital camera, a game console, a navigation, a virtual reality device, a wearable device and so forth.

The data processing system 10 may include a host device 200 and the memory system 100.

The host device 200 may access the memory system 100 by utilizing logical addresses. The host device 200 may assign logical address to data to store the data into the memory system 100.

The host device 200 may configure a plurality of logical regions, that is, a plurality of zones. Each zone may be configured by consecutive logical addresses. The host device 200 may utilize the consecutive logical addresses in an ascending order from the least logical address to the greatest logical address within each zone. That is, the host device 200 may assign, to data, the consecutive logical addresses in an ascending order within each zone. Therefore, a write request provided from the host device 200 to the memory system 100 may be a sequential write request related with the consecutive logical addresses.

The host device 200 may utilize a plurality of open zones at a time. An open zone may be a zone that is currently being utilized to store data into the memory system 100. For example, when the host device 200 includes a plurality of processors (not illustrated), an open zone may be assigned to each of the processors to store data into the memory system 100. Specifically, each of the processors may store data into the memory system 100 by assigning to the data, a logical address within the open zone that is assigned thereto and then by providing the memory system 100 with a write request including the logical address and the data. When each of the processors utilizes all of the logical addresses within the open zone assigned thereto, another open zone may be assigned to the processor.

The memory system 100 may be configured to store therein data provided from the host device 200 in response to a write request from the host device 200. The memory system 100 may be configured to provide stored data to the host device 200 in response to a read request from the host device 200. The memory system 100 may be configured as a personal computer memory card international association (PCMCIA) card, a compact flash (CF) card, a smart media card, a memory stick, various multimedia cards (e.g., MMC, eMMC, RS-MMC, and MMC-micro), secure digital (SD) cards (e.g., SD, Mini-SD and Micro-SD), a universal flash storage (UFS) or a solid state drive (SSD).

The memory system 100 may include a controller 110 and a plurality of memory devices 121 to 124.

The controller 110 may control an overall operation of the memory system 100. The controller 110 may control the memory devices 121 to 124 to perform a foreground operation in response to an instruction from the host device 200. The foreground operation may include operations of writing data into the memory devices 121 to 124 and reading data from the memory devices 121 to 124 in response to instructions from the host device 200, that is, a write request and a read request.

Furthermore, the controller 110 may control the memory devices 121 to 124 to perform a background operation independently of the host device 200. The background operation may include at least one among a wear-leveling operation, a garbage collection operation, an erase operation, a read reclaim operation and a refresh operation for the memory devices 121 to 124. Like the foreground operation, the background operation may include operations of writing data into the memory devices 121 to 124 and reading data from the memory devices 121 to 124.

The controller 110 may manage a plurality of zone blocks ZB included in the memory devices 121 to 124. Each of the zone blocks ZB may be a memory region group. Each of the memory regions included in the memory region group may be a minimum storage unit, on which an erase operation is performed at a time. Data stored in each of the zone blocks ZB may be erased all together. Each of the zone blocks ZB may be configured by one or more memory blocks included in a single memory device, Each of the zone blocks ZB may include memory units respectively corresponding to consecutive physical addresses. The controller 110 may store, according to an order of the physical addresses, data into the memory units within each of the zone blocks ZB. As described below, the controller 110 may store data into an open zone block by mapping an open zone, which is utilized by the host device 200, with the open zone block, which is included in the memory devices 121 to 124.

Figure 2:
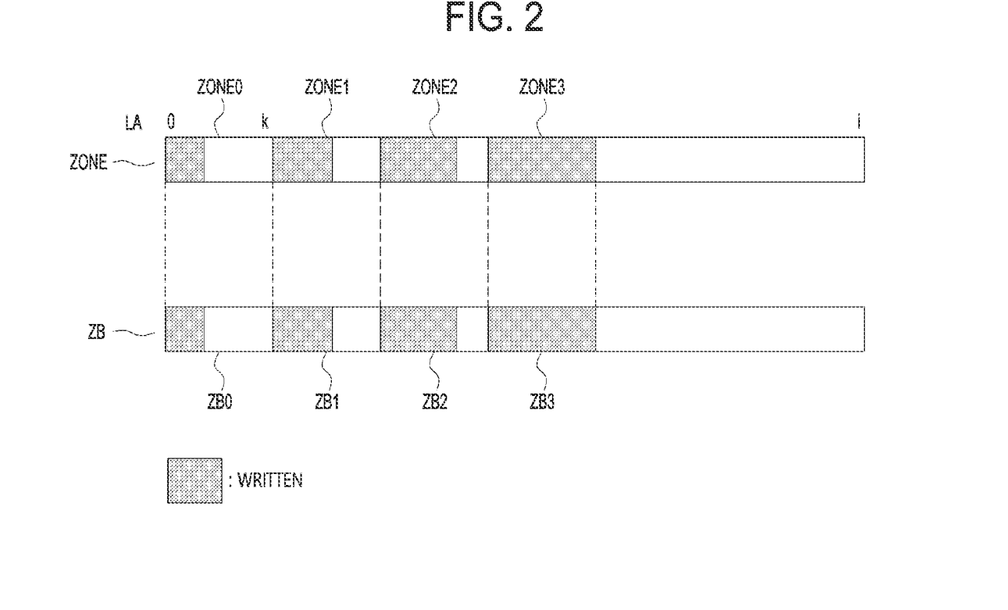
FIG. 2 is a diagram illustrating an operation of mapping zones with zone blocks according to an embodiment of the present disclosure.

FIG. 2 is a diagram illustrating an operation of mapping zones ZONE with zone blocks ZB according to an embodiment of the present disclosure.

Referring to FIG. 2, the host device 200 may configure a plurality of zones, for example, zones ZONE0 to ZONE3 by dividing logical addresses LA of values "0" to "i". Each of the zones ZONE0 to ZONE3 may correspond to consecutive logical addresses. For example, the zone ZONE0 may correspond to consecutive logical addresses of values "0" to "k".

Each of the zones ZONE0 to ZONE3 may be mapped to a corresponding zone block of zone blocks ZB0 to ZB3. For example, the zones ZONE0, ZONE1, ZONE2 and ZONE3 may be mapped respectively to the zone blocks ZB0, ZB1, ZB2 and ZB3. Each size of the zones ZONE0 to ZONE3 may correspond to a size of a corresponding zone block of the zone blocks ZB0 to ZB3. That is, a size of data corresponding to logical addresses configuring each of the zones ZONE0 to ZONE3 may be the same as a storage capacity of the corresponding zone block of the zone blocks ZB0 to ZB3.

When the host device 200 starts utilizing a new open zone, the controller 110 may map the new open zone to an empty zone block, that is, a free zone block. For example, when receiving a write request for a new open zone from the host device 200, the controller 110 may map the new open zone to a free zone block, that is, an empty zone block. A free zone block mapped to a new open zone may be referred to as an open zone block.

When receiving a write request for an open zone from the host device 200, the controller 110 may store data into an open zone block mapped to the open zone. For example, when the write request is for one or more of the logical addresses of the values "0" to "k", that is, when the write request is for the open zone ZONE0 the controller 110 may store data in the open zone block ZB0 mapped to the open zone ZONE0.

Each of the zone blocks ZB0, ZB1 and ZB2 may be an open zone block, into which data is being stored. That is, each of the zone blocks ZB0, ZB1 and ZB2 may be an open zone block that is being utilized for storing data therein. The zone block ZB3 may be a full zone block that is full of data stored therein. As described below with reference to FIG. 3, a zone block may be classified as one of a free zone block, an open zone block, a closed zone block, a buffer zone block and a full zone block according to the status and purpose thereof.

Figure 3:
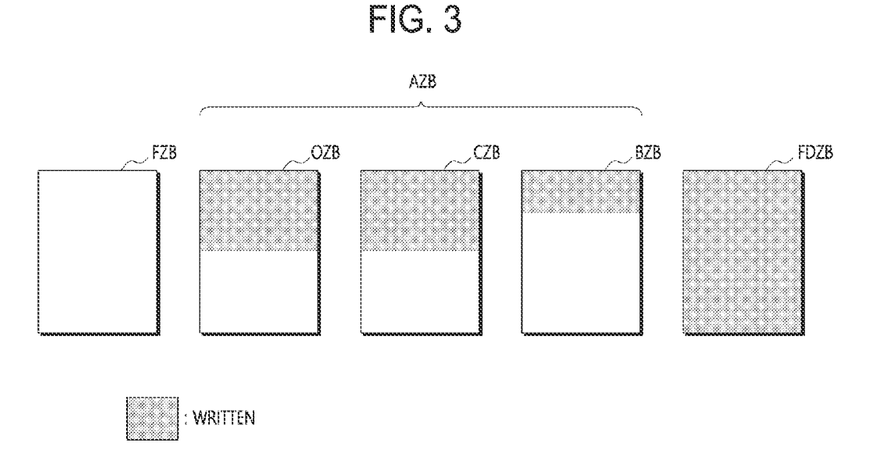
FIG. 3 is a diagram illustrating zone blocks that are classified according to statuses and purposes thereof according to an embodiment of the present disclosure.

FIG. 3 is a diagram illustrating zone blocks that are classified according to statuses and purposes thereof according to an embodiment of the present disclosure.

Referring to FIG. 3, a free zone block FZB may be an empty zone block, that is, a zone block in which data is not stored at all. When mapped to a new open zone, a free zone block FZB may become an open zone block OZB.

An open zone block OZB may be a zone block that is mapped to an open zone. The open zone block OZB may be a zone block, into which data is being written. The controller 110 may allocate, to an open zone block OZB, a partial buffer region within a memory 111. The controller 110 may not store data, which is provided from the host device 200, immediately into the open zone block OZB but may temporarily store the data into the buffer region allocated to the open zone block OZB. When the buffer region of the memory 111 becomes full of data temporarily stored therein, the controller 110 may flush the data from the buffer region of the memory 111 into the open zone block OZB, to which the buffer region is allocated. A storage capacity of the buffer region allocated to the open zone block OZB may correspond to a maximum data size that can be flushed into the open zone block OZB at a time through a write operation. When the buffer region allocated to the open zone block OZB becomes required to be utilized for another purpose, the allocation of the buffer region to the open zone block OZB may be released.

An open zone block OZB may become a closed zone block CZB even when the open zone block OZB is not full of data stored therein. When an open zone block OZB becomes a closed zone block CZB, the allocation of the buffer region to the open zone block OZB may be released for another usage. That is, a closed zone block CZB may be a zone block, into which data is not supposed to be written for a while. A closed zone block CZB may become an open zone block OZB when the previously released buffer region or a new buffer region of the memory 111 is allocated to the closed zone block CZB. In an embodiment, an open zone block OZB may become a closed zone block CZB. For example, when the buffer region allocated to the open zone block OZB is required to be utilized for another purpose, the open zone block OZB may become a closed zone block CZB. For example, an open zone block OZB may become a closed zone block CZB in response to a request from the host device 200. For example, an open zone block OZB may become a closed zone block CZB after a predetermined amount of time from when the open zone block OZB becomes open.

A buffer zone block BZB may be a zone block to be utilized as a temporary buffer of an open zone block OZB. A buffer zone block BZB may be different from a buffer region of the memory 111 to be allocated to the open zone block OZB. Each open zone block OZB may have a corresponding buffer zone block BZB, For example, an open zone block OZB may be a triple level cell (TLC) zone block while a corresponding buffer zone block BZB may be a single level cell (SLC) zone block. That is, a memory cell included in the open zone block OZB may operate as a TLC while a memory cell included in the corresponding buffer zone block BZB may operate as a SLC. When allocation of a buffer region to an open zone block OZB is required to be released, a corresponding buffer zone block BZB may temporarily store therein data remaining in the buffer region. Even when the open zone block OZB becomes a closed zone block CZB due to the release of the allocation of the buffer region, the corresponding buffer zone block BZB may stay corresponding to the closed zone block CZB. When the closed zone block CZB becomes again an open zone block OZB and a buffer region of the memory 111 is allocated again to the open zone block OZB, the data temporarily stored in the corresponding buffer zone block BZB may be moved into the again allocated buffer region.

A full zone block FDZB may be a zone block full of data stored therein. When an open zone block OZB becomes full of data stored therein, the open zone block OZB may become a full zone block FDZB.

In this disclosure, an activated zone block AZB may be one of an open zone block OZB, a closed zone block CZB and a buffer zone block BZB.

Referring back to FIG. 1, the controller 110 may manage an erase count table EC, an activated zone block count table AZBC and a full zone block count table FDZBC within the memory 111. The erase count table EC may include an erase count of each of all of the zone blocks ZB included in the memory devices 121 to 124. The activated zone block count table AZBC may include an activated zone block count of each of the memory devices 121 to 124, that is, a number of activated zone blocks existing in each of the memory devices 121 to 124. The full zone block count table FDZBC may include a full zone block count of each of the memory devices 121 to 124, that is, a number of full zone blocks existing in each of the memory devices 121 to 124. The controller 110 may update, in real time, the erase count table EC, the activated zone block count table AZBC and the full zone block count table FDZBC.

As described above, the controller 110 may determine a free zone block to be mapped to a new open zone when the host device 200 starts utilizing the new open zone. In order to maximize the write and read performances of the memory devices 121 to 124, the controller 110 may select a free zone block to be mapped to a new open zone to evenly distribute open zone blocks in the memory devices 121 to 124.

Specifically, the controller 110 may initially add all of the memory devices 121 to 124 into a candidate memory device list. That is, the candidate memory device list may include information of all of the memory devices 121 to 124 when the controller 110 starts selecting a new free zone block. The controller 110 may select a candidate memory device from the candidate memory device list.

Specifically, the controller 110 may determine, as a candidate zone block, one of free zone blocks included in the memory devices 121 to 124 of the candidate memory device list. For example, the controller 110 may determine, as a candidate zone block, a free zone block having the least erase count among all of the free zone blocks included in the memory devices 121 to 124 of the candidate memory device list. By referring to the erase count table EC, the controller 110 may determine, as a candidate zone block, a free zone block having the least erase count among all of the free zone blocks included in the memory devices 121 to 124 of the candidate memory device list. The controller 110 may select, as a candidate memory device, a memory device including the candidate zone block among the memory devices 121 to 124 of the candidate memory device list.

The controller 110 may identify an activated zone block count of the candidate memory device. By referring to the activated zone block count table AZBC, the controller 110 may identify the activated zone block count of the candidate memory device. The controller 110 may determine whether the activated zone block count of the candidate memory device is greater than a first threshold.

The controller 110 may calculate a difference between full zone block counts of the candidate memory device and each of all of the remaining memory devices. By referring to the full zone block count table FDZBC, the controller 110 may identify the full zone block count of each of the candidate memory device and all of the remaining memory devices among the memory devices 121 to 124. For example, when the full zone block count of the candidate memory device among the memory devices 121 to 124 is 16 and the full zone block counts of remaining three memory devices among the memory devices 121 to 124 are respectively 10, 11 and 19, the differences between the full zone block counts may be respectively 6, 5 and 3. The controller 110 may determine whether at least one of the differences between the full zone block counts is greater than a second threshold.

The controller 110 may determine the candidate zone block as a new open zone block when the activated zone block count of the candidate memory device is not greater than the first threshold and each of the differences between the full zone block counts is not greater than the second threshold.

The controller 110 may evict the candidate memory device from the candidate memory device list when the activated zone block count of the candidate memory device is greater than the first threshold or any of the differences between the full zone block counts greater than the second threshold. Then, the controller 110 may determine, as a new candidate zone block, a free zone block having the least erase count among all of the free zone blocks included in remaining memory devices of the candidate memory device list and may repeat the above described process.

When all of the memory devices 121 to 124 are evicted from the candidate memory device list and thus there is no memory device listed in the candidate memory list as a result of the repetition of the above described process, the controller 110 may determine, as a new open zone block, a free zone block having the least erase count among all of the free zone blocks included in all of the memory devices 121 to 124.

Each of the first and second thresholds may be set as values to maximize the interleaving performance of the memory devices 121 to 124. Each of the first and second thresholds may be heuristically predetermined. Each of the first and second thresholds may be adjusted during an operation of the memory system 100.

In an embodiment, the first threshold may be determined on the basis of the maximum open zone block count and the maximum closed zone block count, which are set within the memory system 100. The maximum open zone block count may be a maximum number of open zone blocks that can exist at the same time within the memory system 100. The maximum closed zone block count may be a maximum number of closed zone blocks that can exist at the same time within the memory system 100. For example, the maximum open zone block count and the maximum closed zone block count may be determined according to setting of the host device 200.

An example of determining the first threshold is as follows. In the example, the maximum open zone block count is 6 and the maximum closed zone block count is 8 for the 4 number of the memory devices 121 to 124, When considering buffer zone blocks respectively corresponding to open zone blocks and closed zone blocks, the maximum number of activated zone blocks that can exist at the same time within the memory devices 121 to 124 is 28, which is a sum of 6 number of open zone blocks, 8 number of closed zone blocks and 14 number of buffer zone blocks respectively corresponding to the open zone blocks and the closed zone blocks. In this case, the write and read performances of the memory devices 121 to 124 may be maximized when 28 number of activated zone blocks are evenly distributed within the 4 number of the memory devices 121 to 124, that is, when 7 number of activated zone blocks are included in each of the memory devices 121 to 124. Therefore, the first threshold may be determined as 7. The write and read performances of the memory devices 121 to 124 will be described with reference to FIG. 4.

The controller 110 may include the memory 111. The memory 111 may operate as a working memory, a buffer memory or a cache memory. The memory 111 as a working memory may be configured to store therein various types of software programs and program data. The memory 111 as a buffer memory may be configured to buffer data to be transferred between the host device 200 and the memory devices 121 to 124. Although not illustrated, the memory 111 may include a buffer region allocated to an open zone block. The memory 111 as a cache memory may be configured to temporarily store therein cache data. The memory 111 may store therein the erase count table EC, the activated zone block count table AZBC and the full zone block count table FDZBC that are managed by the controller 110.

Under the control of the controller 110, the memory devices 121 to 124 may store therein data provided from the controller 110 and may provide the controller 110 with the stored data. The memory devices 121 to 124 may be accessed and operate, in a parallel way, by the controller 110, The memory devices 121 to 124 may operate according to an interleaving scheme, Each of the memory devices 121 to 124 may include one or more zone blocks ZB. Each of the memory devices 121 to 124 may be a nonvolatile memory apparatus such as a flash memory device (e.g., a NAND Flash or a NOR Flash), a Ferroelectrics Random Access Memory (FeRAM), a Phase-Change Random Access Memory (PCRAM), a Magnetic Random Access Memory (MRAM), a Resistive Random Access Memory (ReRAM) and so forth. Each of the memory devices 121 to 124 may include a memory die or a memory chip. Although FIG. 1 illustrates 4 number of the memory devices 121 to 124 included in the memory system 100, the number of memory devices included in the memory system 100 is not limited thereto.

In an embodiment, the controller 110 and the memory devices 121 to 124 may be coupled to each other through a wire or wireless network, a bus, a hub, a switch and so forth.

In an embodiment, the controller 110 and the memory devices 121 to 124 may be physically located away from one another.

Figure 4:
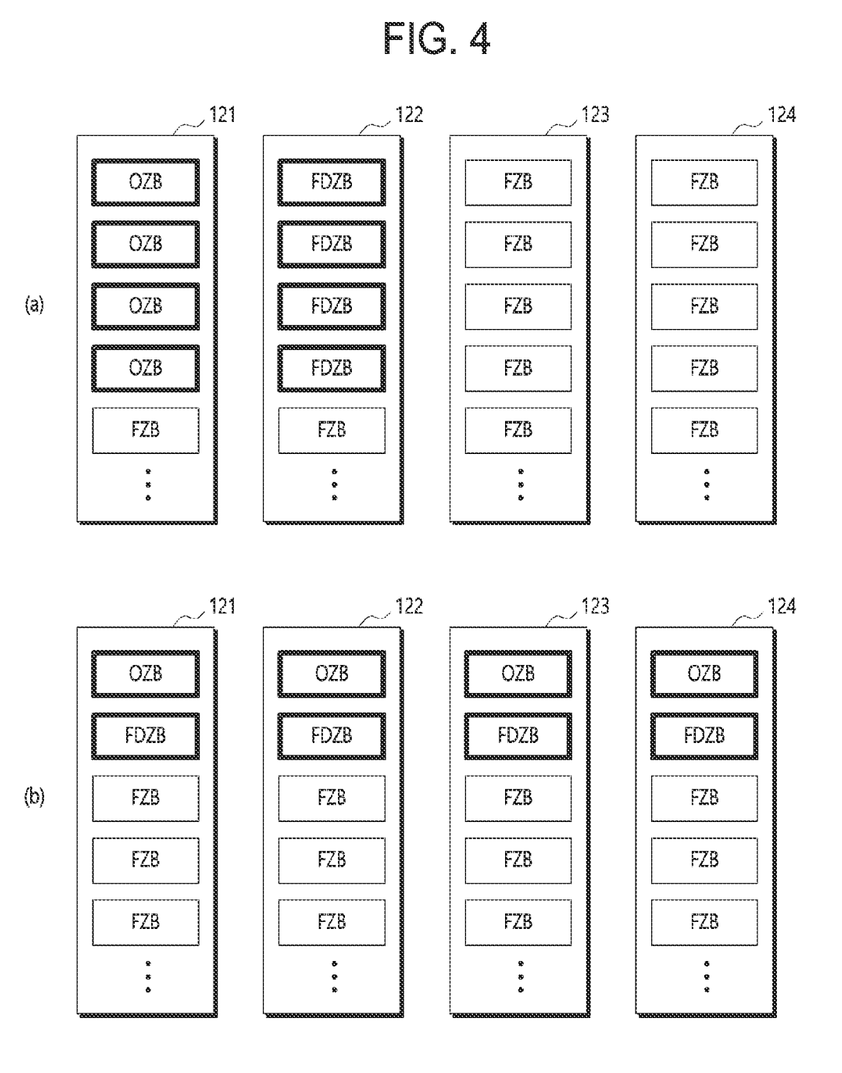
FIG. 4 is a diagram illustrating an effect when open zone blocks are evenly distributed within memory devices according to an embodiment of the present disclosure.

FIG. 4 is a diagram illustrating an effect when open zone blocks OZB are evenly distributed within the memory devices 121 to 124 according to an embodiment of the present disclosure.

Referring to FIG. 4, notation (a) illustrates a situation in which open zone blocks OZB are crowded in the memory device 121 and full zone blocks FDZB are crowded in the memory device 122, In the situation of (a), write operations may be concentrated on the memory device 121 because write requests from the host device 200 are for the open zone blocks OZB. Further, in the situation of (a), read operations may be mainly concentrated on the memory device 122 because read requests from the host device 200 are mainly for the full zone block FDZB even though sometimes for the open zone blocks OZB. Therefore, in the situation of (a), the interleaving performance of the memory devices 121 to 124 may not be maximized.

Referring to FIG. 4, notation (b) illustrates a situation in which open zone blocks OZB are evenly distributed within the memory devices 121 to 124 according to an embodiment. As long as open zone blocks OZB are evenly distributed within the memory devices 121 to 124, full zone block FDZB may be evenly distributed within the memory devices 121 to 124 eventually. Therefore, write and read requests from the host device 200 may be evenly provided to the memory devices 121 to 124, and the memory devices 121 to 124 may perform write and read operations in a parallel way, Hence, according to an embodiment, the interleaving performance of the memory devices 121 to 124 may be maximized and the performance of the memory system 100 may be improved.

Figure 5:
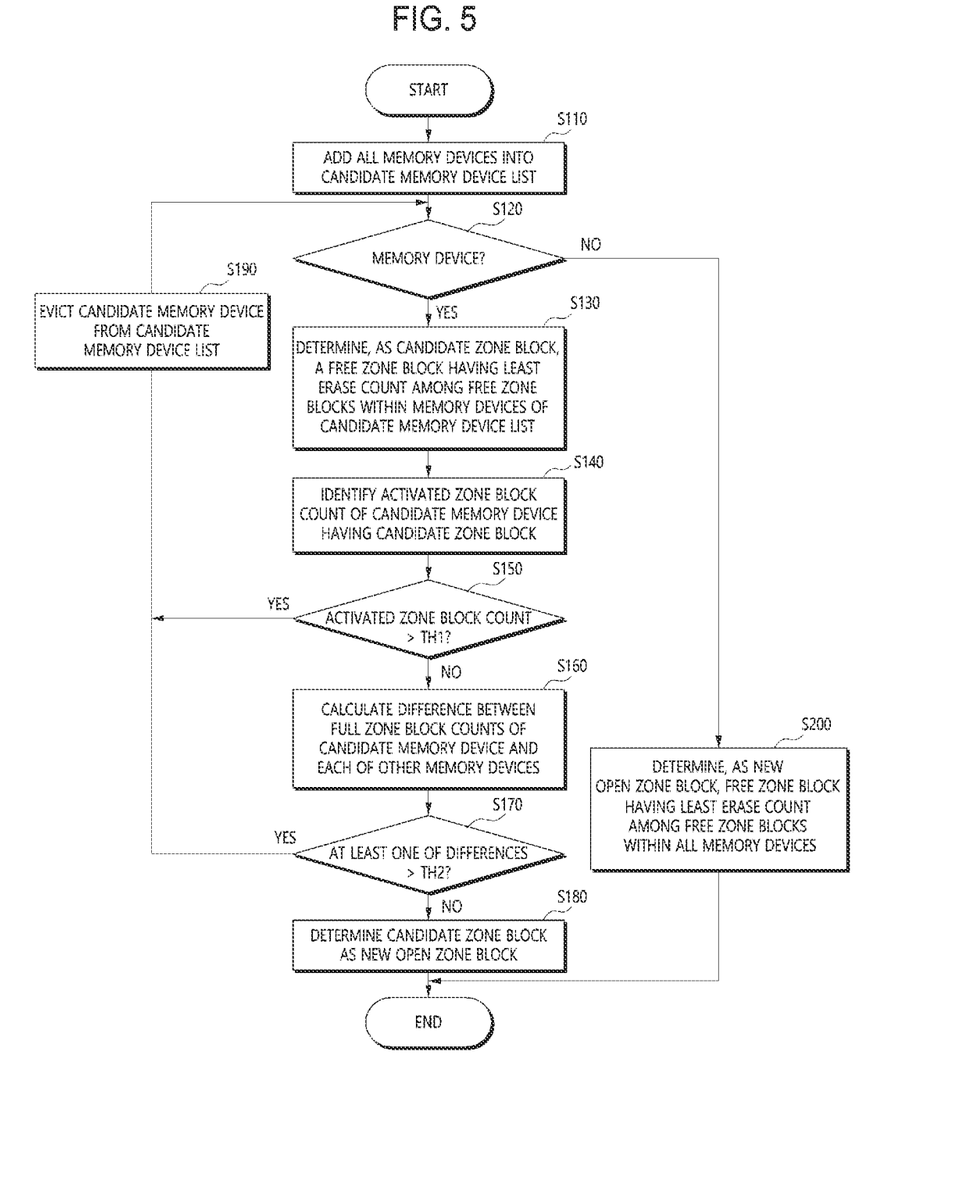
FIG. 5 is a flowchart illustrating an operation of the memory system of FIG. 1 according to an embodiment of the present disclosure.

FIG. 5 is a flowchart illustrating an operation of the memory system 100 of FIG. 1 according to an embodiment of the present disclosure. FIG. 5 illustrates an operation in which the controller 110 determines a free zone block to be utilized as a new open zone block.

Referring to FIG. 5, the controller 110 may add all of the memory devices 121 to 124 into the candidate memory device list at operation S110.

At operation S120, the controller 110 may determine whether any memory device remains in the candidate memory device list. When any memory device is determined to remain in the candidate memory device list, the process may proceed to operation S130. When any memory device is determined not to remain in the candidate memory device list, the process may proceed to operation S200.

At operation S130, the controller 110 may determine, as a candidate zone block, a free zone block having the least erase count among all of the free zone blocks included in the memory devices of the candidate memory device list. By referring to the erase count table EC, the controller 110 may determine, as a candidate zone block, a free zone block having the least erase count among all of the free zone blocks included in the memory devices of the candidate memory device list.

At operation S140, the controller 110 may select, as a candidate memory device, a memory device including the candidate zone block among the memory devices of the candidate memory device list and may identify an activated zone block count of the candidate memory device. By referring to the activated zone block count table AZBC, the controller 110 may identify the activated zone block count of the candidate memory device.

At operation S150, the controller 110 may determine whether the activated zone block count of the candidate memory device is greater than the first threshold TH1. When the activated zone block count of the candidate memory device is determined to be not greater than the first threshold TH1, the process may proceed to operation S160. When the activated zone block count of the candidate memory device is determined to be greater than the first threshold TH1, the process may proceed to operation S190.

At operation S160, the controller 110 may calculate a difference between full zone block counts of the candidate memory device and each of all of the remaining memory devices other than the candidate memory device. By referring to the full zone block count table FDZBC, the controller 110 may identify the full zone block count of each of the candidate memory devices and all of the remaining memory devices among all of the memory devices 121 to 124.

At operation S170, the controller 110 may determine whether at least one of the differences between the full zone block counts is greater than the second threshold TH2. When each of the differences between the full zone block counts is determined to be not greater than the second threshold TH2, the process may proceed to operation S180. When any of the differences between the full zone block counts is determined to be greater than the second threshold TH2, the process may proceed to operation S190.

At operation S180, the controller 110 may determine the candidate zone block to be a new open zone block.

At operation S190, the controller 110 may evict the current candidate memory device from the candidate memory device list. The process may proceed back to operation S120. That is, the controller 110 may repeat operations S130 to S180 on the memory devices remaining in the candidate memory device list.

At operation S200, the controller 110 may determine, as a new open zone block, a free zone block having the least erase count among all of the free zone blocks included in all of the memory devices 121 to 124.

According to an embodiment, a memory system and an operating method of the memory system may improve write and read performances thereof by evenly distributing open zone blocks within memory devices.

While certain embodiments have been described above, it ill be understood to those skilled in the art that the embodiments described are by way of example only. Accordingly, the memory system and operating method thereof should not be limited based on the described embodiments. Rather, the memory system and operating method thereof described herein should only be limited in light of the claims that follow when taken in conjunction with the above description and accompanying drawings. Furthermore, the embodiments may be combined to form additional embodiments.

What is claimed is:

1. A memory system comprising:
   a plurality of memory devices each including zone blocks; and
   a controller configured to evenly distribute open zone blocks within the memory devices by referring to an activated zone block count table and a full zone block count table,
   wherein the activated zone block count table includes an activated zone block count of each of the memory devices, and the full zone block count table includes a full zone block count of each of the memory devices.

2. The memory system of claim 1, wherein the controller evenly distributes the open zone blocks within the memory devices by:

determining a candidate zone block among the zone blocks included in the memory devices, and determining the candidate zone block as a new open zone block, which is to be mapped to a new open zone of a host device, based on the activated zone block count of a candidate memory device and full zone block counts of the memory devices, the candidate memory device having the candidate zone block among the memory devices.

3. The memory system of claim 2, wherein the controller determines the candidate zone block as the new open zone block when:

the activated zone block count is not greater than a first threshold, and each of differences between the full zone block count of the candidate memory device and respective full zone block counts of remaining memory devices is not greater than a second threshold.

4. The memory system of claim 3, wherein the first threshold is determined on the basis of a maximum open zone block count and a maximum closed zone block count.

5. The memory system of claim 2, wherein the controller is further configured to determine a new candidate zone block among the zone blocks included in memory devices other than the candidate memory device when:

the activated zone block count is greater than a first threshold, or any of differences between the full zone block count of the candidate memory device and respective full zone block counts of remaining memory devices is greater than a second threshold.

6. The memory system of claim 2, wherein the controller determines, as the candidate zone block, a free zone block having a least erase count among free zone blocks included in the memory devices.

7. The memory system of claim 1, wherein the activated zone block count represents a number of open zone blocks, closed zone blocks and buffer zone blocks existing within a memory device corresponding thereto.

8. A memory system comprising:

a plurality of memory devices each including zone blocks; and a controller configured to determine, based on an activated zone block count of a candidate memory device among the memory devices and differences of full zone block counts respectively corresponding to remaining memory devices among the memory devices, a candidate zone block included in the candidate memory device as a new open zone block, wherein each of the differences of the full zone block counts is a difference between a full zone block count of the candidate memory device and the full zone block count of a corresponding memory device among the remaining memory devices.

9. The memory system of claim 8, wherein the controller determines the candidate zone block as the new open zone block when:

the activated zone block count is not greater than a first threshold, and each of the differences is not greater than a second threshold.

10. The memory system of claim 9, wherein the first threshold is determined on the basis of a maximum open zone block count and a maximum closed zone block count.

11. The memory system of claim 8, wherein the controller is further configured to determine a new candidate memory device among the remaining memory devices when:

the activated zone block count is greater than a first threshold, or any of the differences is greater than a second threshold.

12. The memory system of claim 8, wherein the controller is further configured to:

determine, as the candidate zone block, a free zone block having a least erase count among free zone blocks included in the memory devices, and determine, as the candidate memory device, a memory device including the candidate zone block.

13. The memory system of claim 8, wherein the activated zone block count represents a number of open zone blocks, closed zone blocks and buffer zone blocks existing within the candidate memory device.

14. The memory system of claim 8, wherein the controller is further configured to map the new open zone block to a new open zone of a host device.

15. An operating method of a memory system, the operating method comprising:

determining, as a candidate zone block, a free zone block having a least erase count among free zone blocks included in memory devices of a candidate memory device list;

determining whether an activated zone block count of a candidate memory device, which has the candidate zone block, is greater than a first threshold;

determining whether any of differences between a full zone block count of the candidate memory device and respective full zone block counts of remaining memory devices is greater than a second threshold; and determining the candidate zone block as a new open zone block according to results of the determining.

16. The operating method of claim 15, wherein the determining of the candidate zone block as the new open zone block includes determining the candidate zone block as the new open zone block when:

the activated zone block count is determined to be not greater than the first threshold, and each of the differences is determined to be not greater than the second threshold.

17. The operating method of claim 15, further comprising evicting the candidate memory device from the candidate memory device list when:

the activated zone block count is determined to be greater than the first threshold, or any of the differences is determined to be greater than the second threshold.

18. The operating method of claim 17, further comprising determining, as the new open zone block, a free zone block having a least erase count among free zone blocks included in all of the memory devices when there is no memory device listed in the candidate memory device list.

19. The operating method of claim 15, wherein the first threshold is determined on the basis of a maximum open zone block count and a maximum closed zone block count.

20. The operating method of claim 15, wherein the activated zone block count represents a number of open zone blocks, closed zone blocks and buffer zone blocks existing within the candidate memory device.

* * * * *